United States Patent Office 3,446,818
Patented May 27, 1969

3,446,818
PROCESS FOR THE PREPARATION OF ALKYLENE MONOTHIOCARBONATES
Geneviève Lebrasseur, born Nicoud, Bully-les-Mines, France, assignor to Ethylène-Plastique, Paris, France, a French society
No Drawing. Filed Dec. 20, 1966, Ser. No. 603,106
Claims priority, application Great Britain, Dec. 23, 1965, 54,569/65
Int. Cl. C07d 99/00
U.S. Cl. 260—327          8 Claims

ABSTRACT OF THE DISCLOSURE

A process is provided for preparing alkylene monothiocarbonates wherein carbon oxysulfide is reacted with an alkylene oxide at a temperature of from 0 to 70° C. in the presence of a catalytic system. The catalytic system contains an alkali metal halide such as lithium, sodium or potassium iodide, lithium or sodium bromide or lithium chloride, water of from 2 to 12% by weight of the alkali metal halide present and a co-catalyst. The co-catalyst may be a compound such as a sulfonium halide, a xanthate or hydrogen sulfide.

---

This invention relates to the preparation of alkylene monothiocarbonates.

Alkylene monothiocarbonates can be obtained by the reaction of carbon oxysulfide (carbonyl sulfide) with alkylene oxides, but even when this reaction is catalysed by amines, it leads to the formation of a mixture of a number of compounds which are difficult and expensive to separate. It has been proposed to prepare propylene monothiocarbonate by reaction of propylene oxide and carbon oxysulfide at temperatures between 60° and 90° C. in the presence of a catalyst of the formula R—O—M, where R is hydrogen, a lower alkyl group or an aromatic group and M is an alkali or alkaline earth metal, but despite the technical progress achieved with this reaction, the monothiocarbonate yields remain relatively low.

The reaction for the formation of the alkylene monothiocarbonate from these two starting products may be generically written as follows:

$$\text{R—CH—CH}_2 + \text{COS} \longrightarrow \text{R—CH——CH}_2$$
$$\diagdown\text{O}\diagup \qquad\qquad\qquad |\qquad| $$
$$\qquad\qquad\qquad\qquad\qquad\text{O}\quad\text{S}$$
$$\qquad\qquad\qquad\qquad\qquad\;\diagdown\text{C}\diagup$$
$$\qquad\qquad\qquad\qquad\qquad\quad\|$$
$$\qquad\qquad\qquad\qquad\qquad\quad\text{O}$$

where R is H, CH$_3$ or a lower alkyl radical or an aryl or cycloalkyl radical. This reaction is difficult to carry out, however, because as a result of its complex mechanism and the relative instability of the monothiocarbonate, a mixture is usually obtained of a large number of products ranging from alkylene trithiocarbonates to alkylene episulfides of varying degrees of polymerisation.

We have now found that by using certain complex catalysts based on a moist or hydrated alkali metal halide, more particularly lithium, sodium, or potassium iodide, lithium or sodium bromide, or lithium chloride, the alkylene monothiocarbonate can be obtained in good yields by the reaction of an alkylene oxide with carbon oxysulfide.

It has been found that the presence of water is beneficial for the synthesis reaction which very probably obeys a mechanism of the ionic type; the water can be supplied to the reaction mixture by the use of an alkali metal halide in moist or hydrated form. The optimum amount of water in the reaction medium is from 2 to 12% by weight with respect to the weight of the alkali metal halide used.

In most cases, however, the hydrated alkali metal halide will not of itself be a sufficiently active catalyst for the reaction to take place between the alkylene oxide and carbon oxysulfide. We have found that a co-catalyst must then be used with this halide and the co-catalyst may be:

hydrogen sulfide or a mercaptan or a thioether,
an alkylsulfonium halide which is added as such or formed in situ,
a xanthate, thiolate, thiocarbonate, thiocarbamate or a sulfide of an alkali metal, or
a polar solvent, preferably an alcohol, which is a good solvent for the alkali metal halide used.

The reaction is carried out at a temperature of from 0° to 70° C., because if the temperature is below 0° C. the reaction is too slow to be useful industrially, while at temperatures above 70° C. there are a number of harmful secondary reactions. The pressure used is generally atmospheric pressure but when the reaction temperature is high the operation must be carried out under pressure in an autoclave because of the high volatility of carbon oxysulfide.

It is thought that under these conditions of temperature, pressure and the like, the co-catalyst used gives, at least transitorily, a xanthate derivative which itself acts as a co-catalyst prepared in situ.

In order that the invention may be more fully understood, the following examples are given by way of illustration only.

Example 1

An autoclave maintained at a temperature of 0° C. was charged with 2.5 moles of ethylene oxide through which H$_2$S had been bubbled to give an H$_2$S content of 0.20% by weight, and 1.9 g. of lithium chloride containing 5% of water. The autoclave was closed and about 1 mole of carbon oxysulfide was introduced progressively. Agitation was started and the autoclave was held at ambient temperature for 15 hours.

At the end of this time, there were obtained 140 g. of a mixture containing:

|  | Percent by weight |
|---|---|
| Ethylene oxide | 30 |
| Ethylene sulfide | 4 |
| Mercaptoethanol | 4 |
| Ethylene monothiocarbonate | 55 |
| Ethylene thiocarbonate | 3 |
| Various | 3 to 4 | i.e. there was obtained 0.73 mole of monothiocarbonate per mole of converted carbon oxysulfide.

Example 2

In a process similar to that described in Example 1, the following were mixed together:

0.25 mole of carbon oxysulfide, 1.5 mole of propylene oxide containing:

|  | Mole |
|---|---|
| Potassium glycol xanthate | 0.02 |
| Hydrated lithium chloride (10%) | 0.02 |

The mixture was left at ambient temperature for 15 hours and a mixture was then collected which contained the following, in addition to the starting materials:

|  | Mole |
|---|---|
| Propylene monothiocarbonate | 0.065 |
| Propylene episulfide | 0.025 |

Propylene monothiocarbonate of 95% purity could be obtained from this mixture by vacuum distillation.

Example 3

A 400 cc. autoclave provided with a thermometer, a bursting disc and a double jacket was cooled to −7° C. and charged with the following:

| | | |
|---|---|---|
| Ethylene oxide | mole | 0.5 |
| Carbon oxysulfide | do | 0.5 |
| Lithium chloride containing 10% of water | g | 0.45 |
| Trimethylsulfonium iodide | g | 1 |

The mixture was agitated in the autoclave for 20 hours at 20° C., the pressure rising above 6 kg./cm.$^2$ and dropping progressively to 1 kg./cm.$^2$ at the end of the reaction. The autoclave was then cooled to 0° C. and vented and the reaction mixture collected contained the following:

| | Mole |
|---|---|
| Ethylene episulfide | 0.08 |
| Ethylene monothiocarbonate | 0.31 |
| Ethylene oxide | 0.05 |

Example 4

A 400 cc. autoclave provided with a thermometer, a bursting disc and a double jacket was cooled from −60° to −70° C. and charged with:

| | Mole |
|---|---|
| Propylene oxide | 0.75 |
| Carbon oxysulfide | 0.5 |
| Lithium chloride containing 10% of water | 0.01 |
| Trimethylsulfonium iodide | 0.01 |

The reaction was carried out for 15 hours at a temperature of 30–40° C. under a pressure of about 5 to 6 kg./cm.$^2$ which dropped to atmospheric pressure at the end of the reaction. The autoclave was cooled to 0° C., vented, and 59 g. of a mixture of the following composition, were collected:

| | Percent |
|---|---|
| Propylene monothiocarbonate | 66 |
| Propylene episulfide | 3 |
| Propylene oxide | 30 |

This is equivalent to a yield of 0.65 mole of monothiocarbonate per mole of carbon oxysulfide introduced.

I claim:

1. In a process for the preparation of alkylene monothiocarbonates by the reaction of carbon oxysulfide with an alkylene oxide, the improvement comprising carrying out the reaction at a temperature of from 0 to 70° C. in the presence of a catalytic system consisting of an alkali metal halide selected from the group consisting of lithium iodide, sodium iodide, potassium iodide, lithium bromide, sodium bromide and lithium chloride, water in an amount of from 2 to 12% by weght based on the amount of alkali metal halide present and a co-catalyst selected from the group consisting of an alkylsulfonium halide, a xanthate and hydrogen sulfide.

2. The process of claim 1 wherein the co-catalyst is formed in situ.

3. The process of claim 1 wherein the alkali metal halide is lithium chloride.

4. The process of claim 1 wherein the co-catalyst is a glycol xanthate.

5. The process of claim 4 wherein the glycol xanthate is potassium glycol xanthate.

6. The process of claim 1 wherein the co-catalyst is an alkylsulfonium halide selected from the group consisting of trimethylsulfonium iodide and triethylsulfonium iodide.

7. The process of claim 6 wherein the alkylsulfonium halide is trimethylsulfonium iodide.

8. The process of claim 1 wherein the water is present in an amount of from 5 to 11% by weight with respect to the amount of alkali metal halide present.

References Cited

UNITED STATES PATENTS

| | | | |
|---|---|---|---|
| 3,232,936 | 1/1966 | Reynolds | 260—247.1 |
| 3,282,960 | 11/1966 | Broderick et al. | 260—327 |

JAMES A. PATTEN, *Primary Examiner.*